Nov. 7, 1961  P. J. LONG, JR  3,007,550
HYDRAULIC SHOCK ABSORBER WITH REBOUND CUT-OFF
Filed Nov. 27, 1959

INVENTOR.
Paul J. Long, Jr.
BY
C. D. C. Staley
His Attorney

United States Patent Office 3,007,550
Patented Nov. 7, 1961

3,007,550
HYDRAULIC SHOCK ABSORBER WITH REBOUND CUT-OFF
Paul J. Long, Jr., Dayton, Ohio, assignor to General Motors Corporation, Detroit, Mich., a corporation of Delaware
Filed Nov. 27, 1959, Ser. No. 855,763
9 Claims. (Cl. 188—88)

This invention relates to hydraulic shock absorbers and particularly to direct-acting type shock absorbers.

In the normal operation of hydraulic shock absorbers a valved piston operates in a cylinder to effect displacement of hydraulic fluid in opposite directions through the piston under control of resistance valving in the piston. Also, the shock absorber is provided with a base valve in the cylinder which resists flow of hydraulic fluid from the cylinder but allows substantially free flow of fluid for return to the cylinder from a reservoir provided around the shock absorber cylinder. Shock absorbers of this general type have the valving in the piston and in the base valve calibrated to take care of normal road shock conditions.

However, there are times when the vehicle on which the shock absorbers are mounted rides over an abnormal obstruction which causes high velocity of movement of the shock absorber on compression and rebound stroke with the result the chassis of the vehicle strikes the bump stops provided on the vehicle. This gives the passengers of the vehicle a severe jolt.

An object of the invention is to provide a hydraulic shock absorber with means in the rebound chamber of the shock absorber to highly restrict, or practically cut off, flow of fluid from the rebound chamber during at least the end portion of the rebound stroke and thereby prevent the vehicle striking the bump stops provided on the vehicle. This is accomplished by providing an auxiliary piston in the rebound chamber of the shock absorber that coacts with the shock absorber piston to effect a substantial entrapment of hydraulic fluid in the rebound chamber of the shock absorber as the shock absorber piston approaches the end of its rebound stroke, the coaction between the auxiliary piston and the shock absorber piston providing for an increase of resistance to movement between the parts of the vehicle attached to the shock absorber during the rebound stroke.

Another object of the invention is to provide a hydraulic shock absorber with increasing resistance to movement of the piston in the cylinder on the rebound stroke wherein the increase to resistance to movement is occasioned when the velocity of movement of the shock absorber piston exceeds a predetermined value. It is desirable that as long as the velocity of movement of the shock absorber piston is not above a value at which the hydraulic fluid flow between opposite sides of the piston can be satisfactorily controlled by the piston valving without having the vehicle strike the bump stops, the need for increase of resistance to movement is not present. Under this circumstance the shock absorber piston can move through its full stroke of rebound under control of the normal valving of the shock absorber.

However, under more severe rebound conditions, where the velocity of movement of the piston of the shock absorber exceeds a predetermined value, the valving of the shock absorber piston is normally insufficient to cause the shock absorber piston to stop movement of the body of the vehicle on rebound movement before the bump stops on the vehicle are engaged. Under this circumstance, it is desirable that the resistance to rebound movement of the shock absorber be increased during at least the portion of the rebound stroke near the end of the stroke to prevent the vehicle striking the bump stops.

It is, therefore, an object of the invention to provide a hydraulic shock absorber wherein the increase to resistance to movement of the shock absorber piston on rebound stroke is occasioned only when the velocity of the movement of the piston exceeds a predetermined value. This can be accomplished by the use of control of flow of hydraulic fluid through a resistance passage provided in an auxiliary piston placed in the rebound chamber of the shock absorber, the valving in the auxiliary piston being such that so long as the hydraulic fluid flow volume through the valving is below a predetermined rate, dependent upon the rate of movement of the auxiliary piston, the valving will not be affected to close off flow of hydraulic fluid between the auxiliary piston and the end of the shock absorber. Under this circumstance the resistance valving in the auxiliary piston will be substantially ineffective. However, when the velocity of movement of the auxiliary piston exceeds a predetermined value, the fluid flow volume through the control valving in the auxiliary piston is such as to produce a pressure differential on opposite sides of the auxiliary piston and move the valving therein to a position substantially to close-off flow of fluid from the entrapment chamber at the rebound end of the shock absorber, and thereby increase the resistance to movement of the auxiliary piston as well as the main piston of the shock absorber since the auxiliary piston is moved by the main piston of the shock absorber during the end portion of the rebound stroke.

It is another object of the invention to provide a hydraulic shock absorber having features of the foregoing objects wherein the control valving in the auxiliary piston is such that the valving will be allowed to gradually take effect as the pressure differential on opposite sides of the auxiliary piston increases during the rebound stroke of the shock absorber.

Further objects and advantages of the present invention will be apparent from the following description, reference being had to the accompanying drawings wherein preferred embodiments of the present invention are clearly shown.

Figures 1, 2:
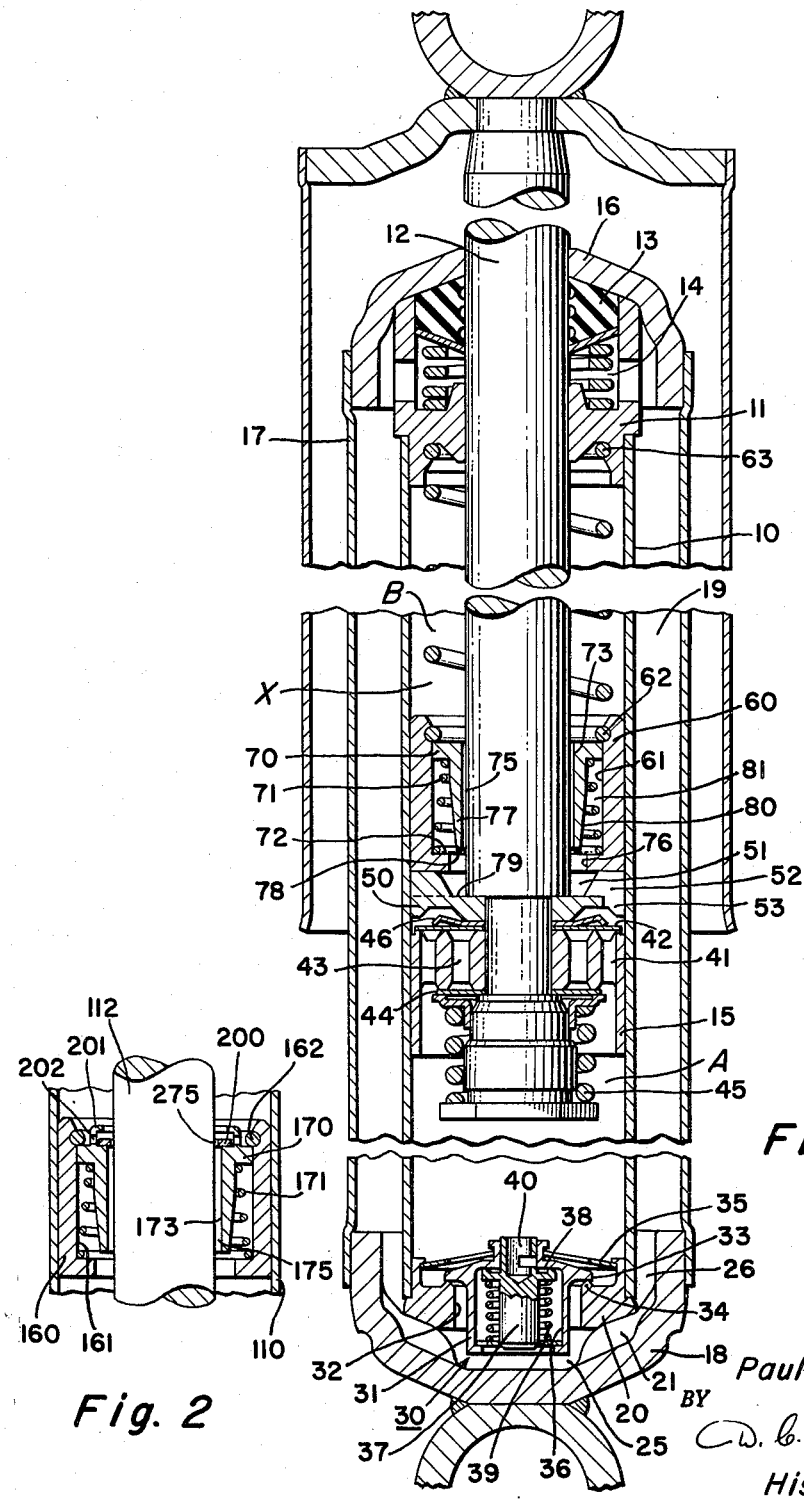
FIG. 1 is a vertical cross-sectional view of a shock absorber incorporating features of this invention.
FIG. 2 is a cross-sectional view of a modified arrangement of the auxiliary control piston of the shock absorber.

Referring to FIG. 1, the shock absorber consists of a cylinder tube 10 in which a piston 15 reciprocates. The cylinder 10 is closed at one end by a rod guide member 11 through which the actuating rod 12 extends, the rod 12 being connected with the piston 15 to actuate the same. The rod 12 extends through a rod seal 13 that is retained in place in the seal chamber 14 by means of a closure cap 16.

The closure cap 16 carries a reservoir tube 17 spaced from the cylinder tube 10 and concentric therewith, the tube 17 being closed at its opposite end by a closure cap 18. The space between the tubes 10 and 17 forms a liquid and air reservoir 19.

The lower end of the shock absorber cylinder 10 is closed by a wall structure 20 that extends transversely of the cylinder tube 10. This wall 20 is supported on inwardly extending abutments 21 provided on the closure cap 18 to space the wall 20 from the closure cap and provide a fluid flow chamber 25 beneath the wall 20 and a flow passage 26 between the chamber 25 and the reservoir chamber 19.

The wall 20 supports a base valve structure 30 adapted to resist flow of hydraulic fluid from the cylinder tube 10 into the reservoir chamber 19 and to allow substantially free flow of fluid from the reservoir chamber into the cylinder tube.

The valve structure 30 consists of a valve element 31 positioned within a valve bore 32 in the wall 20, the valve element 31 having a radially extending annular flange portion 33 that engages the valve seat 34 to close the valve bore 32. A light finger spring 35 holds the valve element 31 on the seat 34 but provides little resistance against lifting of the valve from the seat for flow of hydraulic fluid from the reservoir chamber 19 into the fluid receiving chamber of the cylinder tube 10.

The valve structure 30 has an axial bore 36 that receives a valve element 37 seated against the valve seat 38 by the compression spring 39, an axial opening 40 providing for flow of hydraulic fluid from the lower portion of the cylinder tube 10 against the upper side of the valve 37 and thence into the bore 36 for flow to the reservoir 19. The compression spring 39 controls the point of opening of the valve 37.

The shock absorber piston 15 that is carried on the end of the rod 12 divides the shock absorber cylinder into a compression chamber A and a rebound chamber B, the upper end of the rod 12 normally being attached to the chassis of the vehicle while the lower end of the shock absorber is connected with the axle of the vehicle.

The piston 15 has a series of fluid flow passages 41 providing for flow of hydraulic fluid from the compression chamber A to the rebound chamber B under control of the valve 42. The piston 15 has a second series of fluid flow passages 43 providing for flow of hydraulic fluid from the rebound chamber B to the compression chamber A under control of the valve 44. A compression spring 45 controls the opening point of valve 44 while a disc spring 46 controls the opening point of valve 42.

The shock absorber thus far described will function in a substantially normal manner wherein movement of the piston 15 toward the base valve 30 will place fluid under compression in the chamber A on the compression stroke, excess fluid that is not displaced into the rebound chamber B through the valve 42 being discharged under pressure through the base valve 30 under control of the valve element 37, the volume of fluid flow through the base valve 30 being equivalent to the displacement of rod 12 that enters the rebound chamber B. On the return stroke or rebound stroke, fluid will flow from the rebound chamber B into the compression chamber A under control of the valve 44. Make-up fluid to fill the chamber A on movement of the piston 15 away from the base valve 30 will be received from the reservoir 19 through the bore 32 of the wall 20, valve element 31 opening against the disc spring 35 for this purpose.

The shock absorber thus far described has no additional provision for restricting movement of the piston 15 on the rebound stroke other than the normal valve action of the valves on the piston 15. Thus, when a severe rebound stroke is encountered, the chassis of the vehicle can strike the bump stops provided on the vehicle.

To eliminate this condition, it is desirable to increase the resistance to movement of the piston 15 into the rebound chamber 12 of the shock absorber during at least the latter portion of the rebound stroke. However, unless the velocity of movement of the piston 15 is such as will cause the vehicle to strike the bump stops, it is desirable under normal operating conditions to allow the piston 15 to have its full stroke of rebound without interference of any additional resistance to movement of the piston 15 even in the latter portion of the rebound stroke.

The piston 15 includes an abutment member 50 to limit the maximum degree of opening of the valve 42. This abutment member 50 has an axial chamber 51 from which there extends a plurality of radial passages 52. These radial passages 52 connect with axially directed passages 53, whereby hydraulic fluid can pass into the space between the abutment member 50 in the piston 15 for flow through the passages 43 and thence through the valve 44 into the compression chamber A.

An auxiliary piston 60 is slidably positioned in the cylinder tube 10 for reciprocation in the cylinder. This piston 60 has an open ended auxiliary cylinder chamber 61 open at both ends of the cylinder. The auxiliary piston 60 is attached to one end of a helical spring 62, the spring having its opposite end 63 attached to the rod seal member 11. The spring 62 when in relaxed condition, normally spaces the piston 60 a predetermined distance from the rod guide member 11 and forms thereby a hydraulic fluid entrapment chamber "X" between the auxiliary piston 60 and the rod guide member 11. It is entrapment of hydraulic fluid in this chamber "X" that provides the fluid for control of movement of the piston 60 toward the rod seal end of the shock absorber in the latter portion of the rebound stroke of the piston 15 in a manner hereinafter described.

The auxiliary cylinder chamber 61 in the auxiliary piston 60 receives a secondary piston 70 slidably received in the auxiliary cylinder chamber 61 and adapted for reciprocation therein. The secondary piston 70 is normally retained in the position shown in the drawing against the bottom turn of the spring 62 as a stop member by means of the compression spring 71 placed between the secondary piston 70 and the bottom wall 72 of the auxiliary cylinder chamber 61.

The secondary piston 70 has an axial bore 73 somewhat larger than the outer diameter of the actuating rod 12, thereby forming a fluid flow space 75 defined by the bore 73 and the periphery of the rod 12. This space 75 is calibrated to provide for flow of hydraulic fluid from the entrapment space "X" at a pre-established flow rate without effecting any substantial increase in fluid pressure in the entrapment space "X" so long as the velocity of movement of the auxiliary piston 60 toward the rod seal end of the shock absorber does not exceed a predetermined value. However, whenever the velocity of movement of the auxiliary piston 60 toward the rod seal end of the shock absorber increases beyond a predetermined value, the passage 75 will not pass hydraulic fluid at a sufficient rate to release the fluid from the entrapment chamber "X" so that a pressure develops in the entrapment chamber "X" above that in the rebound chamber "B" below the secondary piston 70 to move the secondary piston downwardly toward the axial bore 76 provided in the bottom wall 72 of the auxiliary cylinder chamber 61.

When this occurs, the reduced diameter portion 77 on the secondary piston 70 enters the bore 76 and finally the end portion 78 of the reduced diameter portion 77 engages the wall 79 on the abutment member 50 to substantially close off passage 75 against any further flow of hydraulic fluid from the entrapment chamber "X."

The compression spring 71 has sufficient resistance that it will hold the secondary piston in the position shown in the drawing to retain the passage 75 open for flow of hydraulic fluid from the entrapment chamber "X" through the bore 76 and thence through the passages 51 and 53 so long as the velocity of movement of the piston 15 and the auxiliary piston 60 in their joint travel toward the rod seal end of the absorber does not exceed a predetermined velocity of movement. Under this circumstance, the piston valving 44 will provide for normal dissipation of shock and control movement of the parts controlled by the shock absorber.

However, whenever the velocity of movement of the piston 15 is such that when it engages the piston 60 and by movement of the piston 60 thereby endeavors to force hydraulic fluid from the entrapment chamber "X" through the passage 75 at a rate beyond which it is calculated to flow without pressure increase in chamber "X," the fluid pressure increase in chamber "X" will then move the secondary piston 70 downwardly to engage the end portion 78 against the abutment face 79 and substantially close off the passage 75 against further flow of hydraulic fluid from the entrapment chamber "X." This will result in a substantial increase to resistance to movement of the shock absorber piston 15 and will prevent the vehicle striking the bump stop.

To graduate and control, the closing movement of the secondary piston 70 toward the face 79 on the abutment 50, the end portion 77 of the piston 70 has the lower portion of the exterior surface thereof formed in the shape of an inverted truncated cone, as shown by the surface 80. This cone-shaped portion 80 enters the bore 76 in the piston 60 and gradually cuts off flow of hydraulic fluid from the entrapment chamber 81 provided between the piston 70 and the cylinder 61 of the piston 60. The rate of flow of hydraulic fluid from the entrapment chamber 81, when piston 70 moves downwardly toward the abutment 50, controls the timing of the engagement of the end portion 78 of the piston 70 with the abutment face 79. The restriction formed by entry of the cone-shaped portion 77 into the opening 76 can also be provided by a flat portion on the extension 77 in place of the cone-shaped surface 80 or by a tapered restriction passage, the restriction being such as to gradually increase resistance to flow of fluid from the entrapment chamber 81 and thereby time the engagement of the end portion 78 with the abutment face 79.

In FIG. 2 there is illustrated a modified arrangement of the auxiliary control piston 60 of FIG. 1. In FIG. 2 the auxiliary piston 160 is reciprocable in the cylinder tube 10 and has the auxiliary cylinder chamber 161 thereof receiving the secondary piston 170 reciprocable in the cylinder chamber 161. The compression spring 171 normally retains the piston 170 in the position shown in FIG. 2 against the bottom end coil of the spring 162 comparable to the spring 62 of FIG. 1. The clearance space 175 between the bore 173 of the piston 170 and the rod 112 is substantially greater than the comparable space 75 of the device of FIG. 1 to allow substantially free flow of fluid between opposite sides of the piston 170.

To restrict free flow of fluid through the passage 175 when the piston 170 moves in an upward direction on rebound stroke of the shock absorber, a check valve 200 seats on the upper face of the piston 170, a resistance passage 275 being provided to resist flow of fluid from the section X to the section Y of the rebound chamber B when the velocity of movement of the piston is above a predetermined value in the same manner as resistance passage 75 of the device of FIG. 1.

A cage member 201 retains the check valve 200 adjacent the seat on piston 170. On downward movement of the piston 170 fluid can flow freely from section Y to section X of the rebound chamber through the passage 175 by lifting check valve 200 off its seat, a plurality of openings 202 being provided in the cage 201 for fluid to pass into chamber X.

While the embodiments of the present invention as herein disclosed constitute preferred forms, it is to be understood that other forms might be adopted.

What is claimed is as follows:

1. In a hydraulic shock absorber, cylinder means having wall means at each end thereof closing the cylinder means, piston means reciprocable in said cylinder and dividing the cylinder means into a compression chamber and a rebound chamber and carried on an actuating rod extending through said rebound chamber, said piston means having valve means controlling flow of fluid through said piston means in opposite directions of flow on opposite reciprocal movement of the piston means in said cylinder means, auxiliary piston means reciprocable in said cylinder means in said rebound chamber thereof and on said rod and dividing said rebound chamber into a first section between said auxiliary piston means and an end wall means closing the rebound chamber of said cylinder means and a second section between said first-mentioned piston means and said auxiliary piston means, resilient compressible and extensible means between said end wall means closing the rebound chamber and said auxiliary piston means positioning said auxiliary piston means normally in predetermined spaced relation to said end wall means closing the rebound chamber and providing for reciprocal movement of said auxiliary piston means relative to the said aforementioned end wall means, said first piston including abutment means engageable with said auxiliary piston for movement thereof therewith during movement of the first piston toward said first section of said rebound chamber, said auxiliary piston means having an open ended auxiliary cylinder chamber therein, secondary piston means reciprocable in said auxiliary cylinder and including passage means for flow of fluid in opposite directions therethrough between said first and second sections, said auxiliary and secondary piston means being engageable with said abutment means during rebound movement of said first piston means for substantial closure of said passage means and entrapment of fluid in said first section to resist thereby rebound movement of said first piston and said auxiliary piston together.

2. In a hydraulic shock absorber, cylinder means having wall means at each end thereof closing the cylinder means, piston means reciprocable in said cylinder and dividing the cylinder means into a compression chamber and a rebound chamber and carried on an actuating rod extending through said rebound chamber, said piston means having valve means controlling flow of fluid through said piston means in opposite directions of flow on opposite reciprocal movement of the piston means in said cylinder means, auxiliary piston means reciprocable in said cylinder means in said rebound chamber thereof and on said rod and dividing said rebound chamber into a first section between said auxiliary piston means and an end wall means closing the rebound chamber of said cylinder means and a second section between said first-mentioned piston means and said auxiliary piston means, resilient compressible and extensible means between said end wall means closing the rebound chamber and said auxiliary piston means positioning said auxiliary piston means normally in predetermined spaced relation to said end wall means closing the rebound chamber and providing for reciprocal movement of said auxiliary piston means relative to the said aforementioned end wall means, said first piston including abutment means engageable with said auxiliary piston for movement thereof therewith during movement of the first piston toward said first section of said rebound chamber, said auxiliary piston means having an open ended auxiliary cylinder chamber therein, secondary piston means reciprocable in said auxiliary cylinder and including passage means for flow of fluid in opposite directions therethrough between said first and second sections, said auxiliary and secondary piston means being engageable with said abutment means during rebound movement of said first piston means for substantial closure of said passage means and entrapment of fluid in said first section to resist thereby rebound movement of said first piston and said auxiliary piston together, and means acting on said secondary piston means to delay engagement thereof with said abutment means until velocity of movement of said auxiliary piston exceeds a predetermined value.

3. In a hydraulic shock absorber, cylinder means having wall means at each end thereof closing the cylinder means, piston means reciprocable in said cylinder and dividing the cylinder means into a compression chamber and a rebound chamber and carried on an actuating rod extending through said rebound chamber, said piston means having valve means controlling flow of fluid through said piston means in opposite directions of flow on opposite reciprocal movement of the piston means in said cylinder means, auxiliary piston means reciprocable in said cylinder means in said rebound chamber thereof and on said rod and dividing said rebound chamber into a first section between said auxiliary piston means and an end wall means closing the rebound chamber of said cylinder means and a second section between said first-mentioned piston means and said auxiliary piston means, resilient compressible and extensible means between said end wall means closing the rebound chamber and said auxiliary piston means positioning said auxiliary piston means normally in predetermined spaced relation to said end wall means closing the rebound chamber and providing for reciprocal movement of said auxiliary piston means relative to the said aforementioned end wall means, said first piston including abutment means engageable with said auxiliary piston for movement thereof therewith during movement of the first piston toward said first section of said rebound chamber, said auxiliary piston means having an open ended auxiliary cylinder chamber therein, secondary piston means reciprocable in said auxiliary cylinder and including passage means for flow of fluid in opposite directions therethrough between said first and second sections, said auxiliary and secondary piston means being engageable with said abutment means during rebound movement of said first piston means for substantial closure of said passage means and entrapment of fluid in said first section to resist thereby rebound movement of said first piston and said auxiliary piston together, said auxiliary piston and said secondary piston being constructed and arranged to provide a fluid entrapment chamber therebetween to resist movement of said secondary piston in said auxiliary piston and thereby movement into engagement with said abutment means.

4. In a hydraulic shock absorber, cylinder means having wall means at each end thereof closing the cylinder means, piston means reciprocable in said cylinder and dividing the cylinder means into a compression chamber and a rebound chamber and carried on an actuating rod extending through said rebound chamber, said piston means having valve means controlling flow of fluid through said piston means in opposite directions of flow on opposite reciprocal movement of the piston means in said cylinder means, auxiliary piston means reciprocable in said cylinder means in said rebound chamber thereof and on said rod and dividing said rebound chamber into a first section between said auxiliary piston means and an end wall means closing the rebound chamber of said cylinder means and a second section between said first-mentioned piston means and said auxiliary piston means, resilient compressible and extensible means between said end wall means closing the rebound chamber and said auxiliary piston means positioning said auxiliary piston means normally in predetermined spaced relation to said end wall means closing the rebound chamber and providing for reciprocal movement of said auxiliary piston means relative to the said aforementioned end wall means, said first piston including abutment means engageable with said auxiliary piston for movement thereof therewith during movement of the first piston toward said first section of said rebound chamber, said auxiliary piston means having an open ended auxiliary cylinder chamber therein, secondary piston means reciprocable in said auxiliary cylinder and including passage means for flow of fluid in opposite directions therethrough between said first and second sections, said auxiliary and secondary piston means being engageable with said abutment means during rebound movement of said first piston means for substantial closure of said passage means and entrapment of fluid in said first section to resist thereby rebound movement of said first piston and said auxiliary piston together, said auxiliary piston and said secondary piston being constructed and arranged to provide a fluid entrapment chamber therebetween to resist movement of said secondary piston in said auxiliary piston and thereby movement into engagement with said abutment means and including resistance passage means controlling fluid flow from said entrapment chamber between said auxiliary and said secondary piston means for escape of fluid from said entrapment chamber and thereby control movement of said secondary piston into engagement with said abutment means after said auxiliary piston has engaged said abutment means.

5. In a hydraulic shock absorber, cylinder means having wall means at each end thereof closing the cylinder means, piston means reciprocable in said cylinder and dividing the cylinder means into a compression chamber and a rebound chamber and carried on an actuating rod extending through said rebound chamber, said piston means having valve means controlling flow of fluid through said piston means in opposite directions of flow on opposite reciprocal movement of the piston means in said cylinder means, auxiliary piston means reciprocable in said cylinder means in said rebound chamber thereof and on said rod and dividing said rebound chamber into a first section between said auxiliary piston means and an end wall means closing the rebound chamber of said cylinder means and a second section between said first-mentioned piston means and said auxiliary piston means, resilient compressible and extensible means between said end wall means closing the rebound chamber and said auxiliary piston means positioning said auxiliary piston means normally in predetermined spaced relation to said end wall means closing the rebound chamber and providing for reciprocal movement of said auxiliary piston means relative to the said aforementioned end wall means, said first piston including abutment means engageable with said auxiliary piston for movement thereof therewith during movement of the first piston toward said first section of said rebound chamber, said auxiliary piston means having an open ended auxiliary cylinder chamber therein that is open at both ends of the cylinder chamber for flow of fluid through the auxiliary piston means, secondary piston means reciprocable in said auxiliary cylinder chamber and forming with said actuating rod passage means for flow of fluid in opposite directions between said first and second sections of said rebound chamber, said passage means providing for a predetermined and controlled rate of flow of fluid from said first section to said second section of said rebound chamber, said auxiliary piston means being engageable with said abutment means during rebound movement of said first piston for concurrent movement of the said pistons during the end portion of the rebound movement, said secondary piston being movable relative to said auxiliary piston by fluid pressure created in said rebound chamber between said auxiliary piston and the rod seal end of the shock absorber and into engagement with said abutment means thereby during rebound movement of said first piston and said auxiliary pistons together, engagement of said secondary piston means with said abutment means effecting substantial closure of said passage means and entrapment thereby of fluid in said first section of said rebound chamber to resist rebound movement of said first piston and said auxiliary piston together during the latter part of the rebound stroke of the first piston.

6. Hydraulic shock absorber means constructed and arranged in accordance with claim 5 wherein said auxiliary piston and said secondary piston are constructed and arranged to provide a fluid entrapment chamber therebetween and including resistance passage means effecting controlled flow of hydraulic fluid from the said entrapment chamber to effect controlled movement of said secondary piston relative to said auxiliary piston into engagement with said abutment means for substantial closure of said passage means.

7. Hydraulic shock absorber means constructed and arranged in accordance with claim 5 wherein said auxiliary piston and said secondary piston are constructed and arranged to provide a fluid entrapment chamber therebetween and including valved resistance passage means effecting controlled flow of hydraulic fluid from the said entrapment chamber to effect controlled movement of said secondary piston relative to said auxiliary piston into engagement with said abutment means for substantial closure of said passage means.

8. Hydraulic shock absorber means constructed and arranged in accordance with the structure set forth in claim 6 wherein said resistance passage means for said entrapment chamber between said auxiliary piston and said secondary piston comprises a conical-shaped portion on said secondary piston coacting with cylindrical passage means in said auxiliary piston to increasingly restrict flow of fluid from the said entrapment chamber as the secondary piston moves relative to said auxiliary piston.

9. Hydraulic shock absorber means constructed and arranged in accordance with the structure set forth in claim 6 wherein said resistance passage means for said entrapment chamber between said auxiliary piston and said secondary piston comprises a shaped portion on said secondary piston coacting with cylindrical passage means in said auxiliary piston to increasingly restrict flow of fluid from the said entrapment chamber as the secondary piston moves relative to said auxiliary piston.

References Cited in the file of this patent

UNITED STATES PATENTS

| | | |
|---|---|---|
| 2,161,811 | Grebe | June 13, 1939 |
| 2,599,477 | Patriquin | June 3, 1952 |
| 2,606,630 | Rossman | Aug. 12, 1952 |
| 2,928,670 | Schnitzer | Mar. 15, 1960 |